Dec. 30, 1969     C. J. BENHAM     3,487,425
POWER SHAFT COUPLER
Filed April 23, 1968
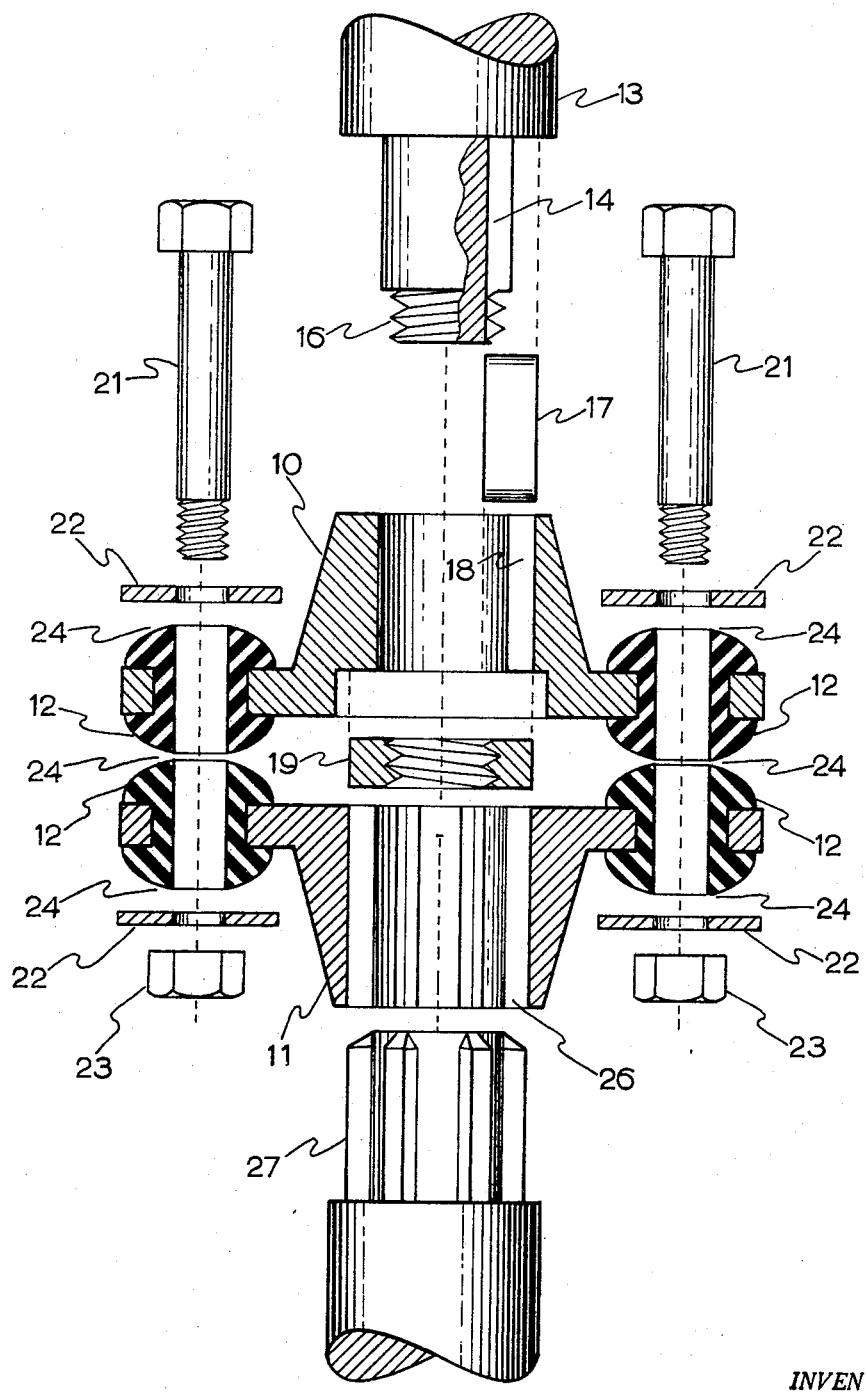
INVENTOR.
CHARLES J. BENHAM
BY
Richard K. Macneill

United States Patent Office 3,487,425
Patented Dec. 30, 1969

3,487,425
POWER SHAFT COUPLER
Charles J. Benham, 9191 Todas Santos,
Santee, Calif. 92071
Filed Apr. 23, 1968, Ser. No. 723,358
Int. Cl. F16d 3/58
U.S. Cl. 64—11                                     4 Claims

ABSTRACT OF THE DISCLOSURE

A powershaft coupler for coupling a driving shaft to a driven shaft having first and second coupling hubs with coupling means in the center portion thereof for coupling to the driven and driving shafts, respectively, each of the hubs having a flange portion with a plurality of cooperating bores around the periphery thereof; each of said bores being lined with a resilient grommet through which bolts are passed resiliently coupling the two flange portions together which allows for normal angular and axial misalignment of the driven and driving shafts.

BRIEF DESCRIPTION OF THE INVENTION

The present invention relates to a powershaft coupler and more particularly to a powershaft coupler in which there is no metal-to-metal contact.

According to the invention, a powershaft coupler is provided having first and second hub elements for attachment to driven and driving shafts, respectively. Each of the hub elements has a plurality of bores spaced evenly around the periphery of a flange portion and positioned for intercooperation. Each of the bores is lined with a resilient grommet through which a bolt is passed and a nut tightened on the opposite flange side. This results in a coupling in which there is no metal-to-metal contact between the driven and driving shaft with sufficient flexibility to allow for reasonable axial and angular misalignment.

An object of the present invention is the provision of a flexible shaft coupler for coupling a driven and driving shaft.

Another object is to provide a powershaft coupler in which there is no metal-to-metal contact between the driven and driving shafts.

A further object of the invention is the provision of a flexible powershaft coupler which is simple and inexpensive to manufacture and assemble and is extremely durable.

Other objects and many of the attendant advantages of the present invention will be readily appreciated as the same becomes better understood by reference to the following detailed description when considered in connection with the accompanying drawing in which the sole figure is an exploded side elevation view.

DETAILED DESCRIPTION OF THE DRAWING

Referring to the drawing, a powershaft coupler is shown for coupling a driving shaft 13 to a driven shaft 27. First and second coupling hubs shown generally at 10 and 11 have center bores 18 and 26 for receiving shafts 13 and 27, respectively. It is contemplated that shaft 13 will be threadably engaged with bore 18, as at captured nut 19, and shaft 27 will be frictionally or press-fitted into a splined bore 26.

Each of coupling hubs 10 and 11 has a flange portion with a plurality of peripheral bores 24. The peripheral bores 24 in hub 10 and the peripheral bores 24 in hub 11 are in axial alignment. Each of the peripheral bores 24 has a resilient grommet 12, which can be rubber or plastic, mounted thereto. Coupling bolts 21 are then placed through the centers of the aligned grommets 12 and nuts 23 together with washers 22 engaged thereto. This results in a firm coupling between driving shaft 13 and driven shaft 27 without any metal-to-metal contact between the shafts since all of the physical contact is at the meeting of grommets 12. Since grommets 12 are constructed of a resilient material, a reasonable amount of axial and angular misalignment is provided for between shafts 13 and 27. It can be seen that the only parts subject to excessive wear in the event of misalignment of the shafts will be the resilient grommets 12 which can be easily and inexpensively replaced.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

I claim:
1. A powershaft coupler for coupling a driving shaft to a driven shaft comprising:
   first and second coupling hubs, said first and second coupling hubs being adapted for being fixedly attached to a driven shaft and a driving shaft, respectively;
   each of said coupling hubs having a flange portion;
   each of said flange portions having a plurality of axially aligned bores around their periphery;
   each of said bores having a resilient grommet therein;
   coupling means coupling each of said axially aligned bores together, said coupling means including a shaft passing therethrough and operable for holding said resilient grommets in abutting engagement.
2. The powershaft coupler of claim 1 and further including:
   a captured nut in at least one of said first and second coupling hubs for a threadable engagement with a shaft.
3. The powershaft coupler of claim 1 wherein:
   said shafts coupling said axially aligned bores comprise a plurality of nuts and bolts.
4. The powershaft coupler of claim 1 wherein:
   at least one of said first and second coupling hubs is internally splined for receiving a cooperating shaft.

References Cited
UNITED STATES PATENTS

| | | | |
|---|---|---|---|
| 2,457,507 | 12/1948 | Strachovsky | 64—11 |
| 2,839,116 | 6/1958 | Friedl | 64—11 X |
| 3,199,315 | 8/1965 | Morse | 64—27 |

HALL C. COE, Primary Examiner